United States Patent [19]

Spet

[11] Patent Number: 4,770,776

[45] Date of Patent: Sep. 13, 1988

[54] MEMBRANE BAG, A WINDING MODULE MADE FROM A MEMBRANE BAG AND A METHOD OF PRODUCING A MEMBRANE BAG

[75] Inventor: Gerhard Spet, Vienna, Austria

[73] Assignee: Vogelbusch Gesellschaft m.b.H., Austria

[21] Appl. No.: 72,246

[22] Filed: Jul. 10, 1987

[30] Foreign Application Priority Data

Jul. 22, 1986 [AT] Austria ................................ 1979/86

[51] Int. Cl.$^4$ ............................................. B01E 13/00
[52] U.S. Cl. ................................................... 210/487
[58] Field of Search .................... 210/321.84, 321.75, 210/487; 55/16, 158

[56] References Cited

U.S. PATENT DOCUMENTS 3,567,028  3/1971  Hose ............................ 210/321.75 X
3,796,313  3/1974  Bigt et al. ........................ 210/321.75

Primary Examiner—Frank Spear
Attorney, Agent, or Firm—Ostrolenk, Faber, Gerb & Soffen

[57] ABSTRACT

A membrane bag, a winding module and a method of making the membrane bag and winding module. The membrane bag and winding module comprise two separation membranes interconnected at their rims and having supply and drain conduits. The membrane bag and winding module are pressure tight and operationally safe at high pressures and temperatures. The rims of the separation membranes are flanged-in at least twice and glue layers are provided between superposed flange rims.

14 Claims, 2 Drawing Sheets

MEMBRANE BAG, A WINDING MODULE MADE FROM A MEMBRANE BAG AND A METHOD OF PRODUCING A MEMBRANE BAG

BACKGROUND OF THE INVENTION

1. Field of the Invention

The invention relates to a membrane bag. The bag comprises two separation membranes interconnected at their rims and having supply and drain conduits. The invention also relates to a winding module made of the membrane bag as well as a method of producing the membrane bag and winding module. 2. Description of the Related Prior Art In the prior art, separation membranes consist of a thin, comparatively permeable carrier foil. On one side of the carrier foil an active coating is applied. This is the so-called asymmetrical separation membrane. There also exist separation membranes consisting exclusively of the active layer itself. Also, so-called symmetrical separation membranes are known. These membranes have an active coating on both sides of a carrier foil.

A great number of polymers, such as cellulose derivatives, e.g., cellulose acetate, various polyamides, polysulfones and also inorganic materials, such as graphite oxide and zirconium hydroxide, are known as active coatings. The active coatings usually have a thickness of between $10^{-3}$ to $10^{-1}$ mm.

Membrane bags and winding modules are used in apparatuses for carrying out membrane separation methods, such as inverted osmosis, ultra or microfiltration, gas separation and pervaporations. In these methods, the media to be treated, i.e. liquids, solutions or vapors, are guided past a separation membrane under pressure. As a result of the pressure, certain components of the media which are permeable to the membrane pass through the membrane as permeate.

In the prior art membrane bags and winding modules, the separation membranes have simply been glued together at their rims and subsequently sewn, stapled or clamped together at the glued rim regions. However, the media in the interior of the membrane bags and winding modules is under substantial pressure of up to approximately 80 bars. Only in separation membranes consisting sometimes sufficiently durable to withstand the pressure. At higher temperatures, or a multi-layer separation membrane system, the prior art membrane bags are not satisfactory. The connections leak, or with multi-layer membranes, the inner active coating becomes detached.

SUMMARY OF THE INVENTION

Accordingly, an object of the present invention is to overcome the deficiencies of known membrane bags and winding modules indicated and to provide tight and operationally safe products for high pressures and temperatures.

These and other objects of the present invention are achieved by providing separation membranes with rims which are at least twice flanged-in. Glue layers are provided between the superposed flanged-in rims.

Another object of the invention is the production of a membrane bag. This object is achieved by gluing two superposed separation membranes (optional with insertion of a layer of porous material between the separation membranes) at their rim regions. The glued together rims are flanged-in relative to one of the two separation membranes while interposing a layer of glue. The flange ledge thus formed is flanged-in a second time relative to the separation membrane while interposing a second layer of glue. Thus, the forces resulting from pressure do not act only on the rim gluing located at the separation membrane sides facing each other; rather, they are distributed over both sides of the separation membranes. A detachment of the inner active coating is completely avoided in this manner.

According to a preferred embodiment, the glue layers having the double flanging are formed of a strip bent to a U-shape and coated at both sides with glue. The stability of the resulting membrane bags is increased, and their production is simplified. Also, a layer of porous material is arranged as an inner spacer between the separation membranes within the flangedin rims. Adhesion of the inner active coatings is prevented by the porous layer, and the dimensional stability of the membrane bags is increased. A woven fabric, a knitted fabric or a nonwoven fabric or organic or inorganic fibres may be used for the porous material. Natural as well as synthetic fibres may be used as the organic fibres. The inorganic fibres are preferably glass fibres. Also a layer of open-porous foam material is suitable for certain applications.

Another object of the invention is to provide a winding module comprising the membrane bag and tubes arranged at the inner side of two opposite flanged-in rims of a rectangular membrane bag. The membrane bag is rolled in around one of the tubes, and the rolled membrane bag is arranged in an enveloping tube. Winding modules are utilized for pervaporations, e.g. for the pervaporation of ethanol.

A further object of the invention is the production of a winding module. This object is achieved by introducing tubes into the interior of the membrane bag inside of two opposite flange rims of a rectangular membrane bag and parallel to these flange rims. The membrane bag (optionally after positioning a layer of porous material onto the outer side of the membrane bag) is rolled around one of the tubes. The rolled-up membrane bag, having substantially the shape of a cylinder, is put into an enveloping tube, and the enveloping tube is closed with a layer of pourable sealing mass at one of its ends. The tubes lead away from the rolled-up membrane bag.

Two superposed webs of separation membranes may be simultaneously interconnected at both longitudinal sides in the manner described. A membrane bag in the form of a flat, tight hose is formed. This may (optionally with insertion of a layer of porous material) be directly rolled up into a winding module. The mutual longitudinal displacement of the two separation membranes resulting during the rolling-up procedure may be compensated as long as the glue has not set.

Other features and advantages of the invention are described below, with reference to the accompanying drawings.

DETAILED DESCRIPTION OF THE PREFERRED EMBODIMENTS

Figure 1:
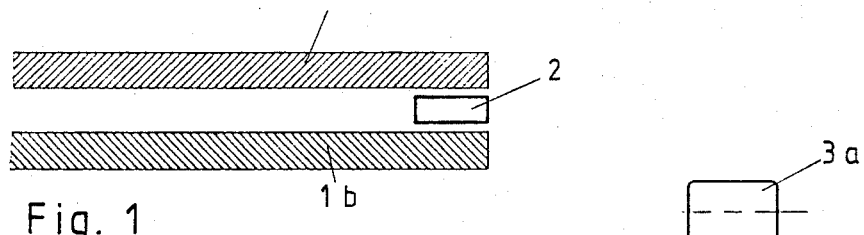
FIGS. 1 to 5 show in section the rim zone of two superposed separation membranes in various stages of the production method according to the invention.
Figure 2:
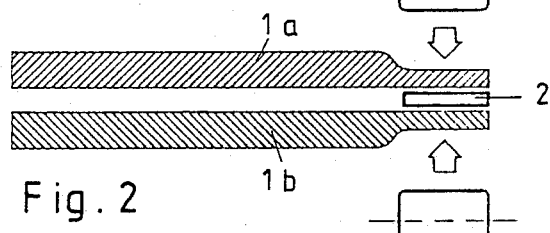

Referring to FIG. 1, the two separation membranes of the present invention are shown as 1a and 1b. In the first step of the invention, a first glue layer 2 is introduced into the rim region of the separation membranes. Gluing is completed by the application of pressure and possibly heat. One method of gluing is by rolling the rims of membranes 1a and 1b between two rollers indicated with 3a and 3b (FIG. 2).

The first gluing need not, as in the case illustrated, take place immediately at the rim of the separation membranes, but may also be made slightly spaced inwardly from the rim. Also, a strip with glue or foil coated at both sides thereof with glue may be used for making this first gluing.

Figure 3:
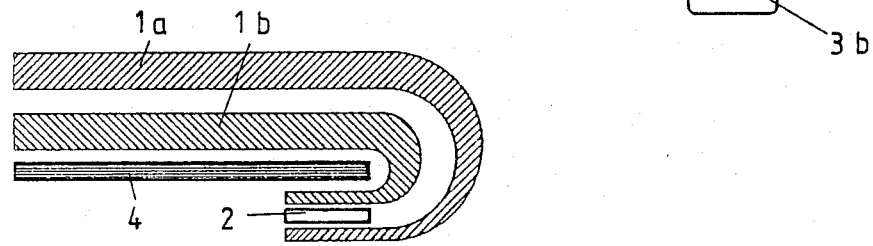

Referring to FIG. 3, the glued together rims are flanged-in or bent-over relative to one of the two separation membranes (1b in the case illustrated), while interposing a strip 4 coated at both sides thereof with glue.

Figure 4:
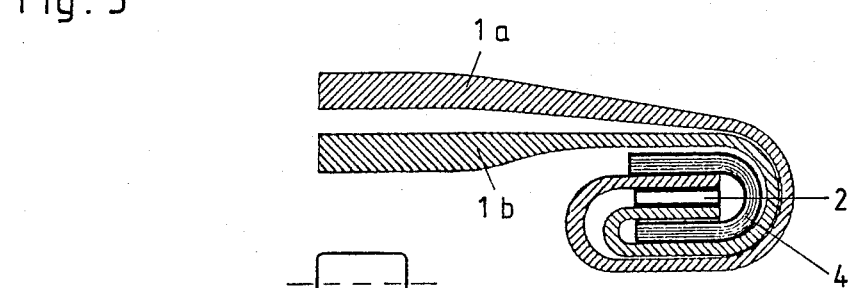

As can be seen from FIG. 4, the flange rim thus formed is flanged-in once more in the same direction. The portion of the strip 4 located in the flange rim is also bent over. Thus, strip 4 becomes U-shaped in cross-section. The two legs of the U thus function as glue layers.

Figure 5:
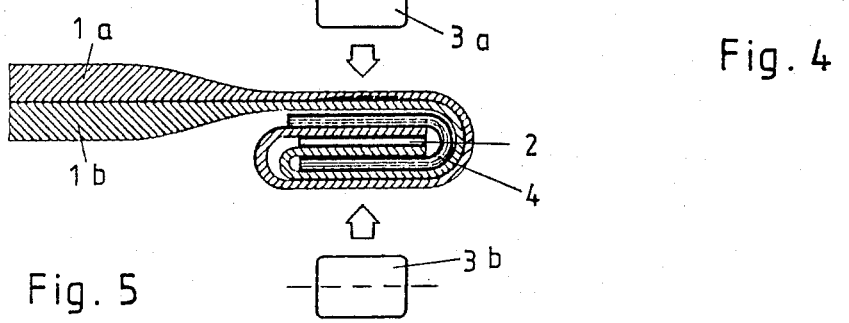

Finally, referring to FIG. 5, the rim connection of the separation membranes 1a and 1b is finished. The rim regions of membranes 1a and 1b are simply pressed together or rolled together by means of the rollers 3a and 3b.

Of course, instead of using the gluing strip or foil coated at both of its sides, gluing together is also possible with each of the other glues, so long as the glued sites are sufficiently resistant to the media and temperature utilized.

The gluings can be made with a cold-setting glue, such as a silicone glue. According to another embodiment, the gluings are made with a glue that is to be processed in the hot state, such as a melting glue or a heat sealing glue.

At room temperature, melting glues are present in solid form and without solvents. These glues belong to the group called thermoplastics. The most important glues of this group are: polyamides, copolyamides and polyaminoamides; saturated polyesters and ethylen-vinyl acetate-copolymers. Heat sealing glues are glues that are applied as dispersion glues or glue lacquers. These glues are dried before the gluing, and subsequently are pressed together simultaneously with heat being applied to the opposite side.

Figure 6:
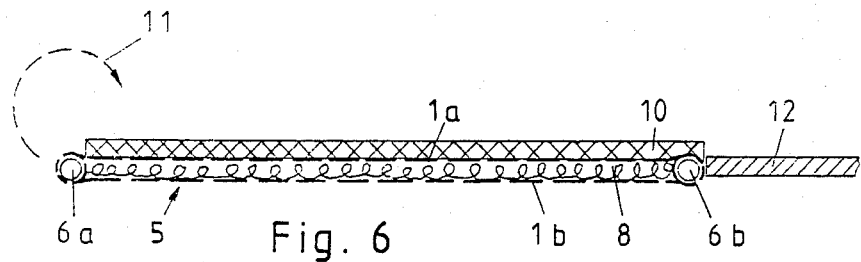
FIG. 6 shows a schematical longitudinal section through an embodiment of a membrane bag having an inner and an outer layer of porous material.
Figure 7:
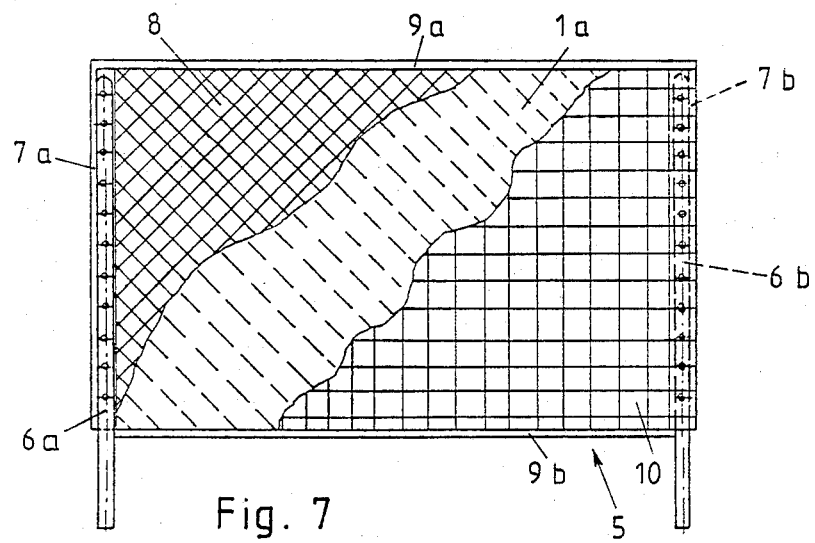
FIG. 7 shows schematically a partly cut-away top view of a membrane bag according to FIG. 6.

The membrane bag according to FIGS. 6 and 7 and generally illustrated as 5 has a rectangle shape. Two perforated tubes 6a and 6b are provided for supplying and draining the media to be separated. Tubes 6a and 6b are inserted into the interior of the membrane bag 5 and are located inside and parallel to two opposite flange rims 7a and 7b. Perforations are provided in the sections of tubes 6a and 6b that are located in the interior of membrane bag 5.

Between the separation membranes 1a and 1b, which are indicated in broken lines in FIG. 6, a layer 8 of porous material is arranged as an inner spacer within the flange rims 7a, 7b, 9a and 9b.

If a winding module is to be produced, a further layer 10 of porous material is placed upon membrane bag 5. The membrane bag is rolled about one of the tubes with the layer 10 as an outer spacer. In the embodiment illustrated, membrane bag 5 is rolled about perforated tube 6a, as indicated in FIG. 6 by arrow 11 in broken lines.

Figure 8:
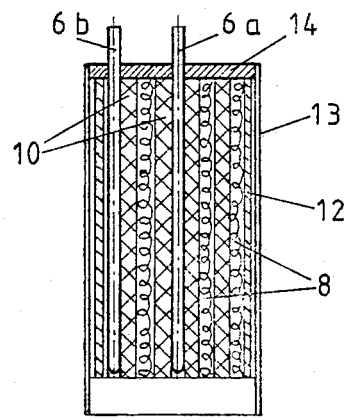
FIG. 8 shows a cross-section through an embodiment of a winding module.

A flexible web material 12 may be attached to the flange rim 7b located on the outer side of membrane bag 5. The material 12 is positioned around the rolled membrane bag thus forming an outer shield. A substantially cylindrical body is formed which is inserted into an enveloping tube 13 of suitable diameter (FIG. 8). At one end of the enveloping tube 13, tubes 6a and 6b lead away from the rolled-up membrane bag, and a layer of pourable sealing mass 14 is introduced. This end is closed by pourable sealing mass 14. Pourable sealing mass 14 provides sealing around tubes 6a and 6b of flange rims 7a, 7b and 9b, and thus a closed inner space between the separation membranes 1a and 1b is formed. Also, the rolled-up membrane bag is kept in place. The other end of the enveloping tube 13 remains open.

In operation, the medium to be separated is supplied under pressure through one of the tubes 6a or 6b. Additionally, a vacuum may be applied to the open end of enveloping tube 13. The medium is drained through the other tube. The permeate passing through the separation membranes 1a and 1b is drawn off from the open end of the enveloping tube 13.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What I claim is:

1. A membrane bag comprising two separation membranes said separation membranes having rims and being interconnected at their rims and further having supply and drain means, the rims of the separation membranes being at least twice flanged-in to form superposed flange rims and further comprising glue layers provided between said superposed flange rims.

2. A membrane bag as set forth in claim 1, wherein with twice flanged-in separation membrane rims, said glue layers are formed by a strip coated on both sides thereof with glue and having U-shape.

3. A membrane bag as set forth in claim 1, wherein a layer of porous material is provided between the separation membranes as an inner spacer within the flange rims.

4. A winding module made from a rectangular membrane bag formed of two separation membranes interconnected at their rims and having supply and drain means, the rims of the separation membranes being at least twice flanged-in with glue layers provided between the superposed flange rims, said winding module comprising perforated tubes arranged inside of two opposite flange rims of a rectangular membrane bag, the membrane bag being rolled-in around one of said perforated tubes, and further comprising an enveloping tube accommodating the rolled-up membrane bag.

5. A method of producing a membrane bag comprising superposing two separation membranes gluing together said superposed separation membranes at their rim regions, flanging-in said glued together rims relative to one of the separation membranes while interposing a first glue layer to form a flange ledge and flanging-in a second time the flange ledge relative to said separation membrane while interposing a second glue layer.

6. A method as set forth in claim 5, wherein said gluings are made of a cold-setting glue.

7. A method as set forth in claim 6, wherein said cold-setting glue is a silicone glue.

8. A method as set forth in claim 5, wherein said gluings are made with a glue to be processed in the hot state.

9. A method as set forth in claim 8, wherein said glue to be processed in the hot state is a melting glue.

10. A method as set forth in claim 8, wherein said glue to be processed in the hot state is a hot sealing glue.

11. A method as set forth in claim 5, wherein said glued together rims of said separation membranes are twice flanged-in while interposing a strip coated with glue at both sides thereof.

12. A method as set forth in claim 5, wherein a layer of porous material is inserted between said separation membranes.

13. A method according to claim 5 for making a winding module made from a rectangular membrane bag formed of two separation membranes interconnected at their rims, the rims of the separation membranes being at least twice flanged-in with glue layers provided between said superposed flange rims, said method comprising introducing two perforated tubes into the membrane bag interior, inside of two opposite flange rims and in parallel to said flange rims, rolling-in said membranes bag around one of said perforated tubes, thus giving the rolled-up membrane bag a substantially cylindrical shape, inserting said cylindrically shaped membrane bag into an enveloping tube and closing said enveloping tube with a layer of pourable sealing mass at one end thereof, from which end said tubes lead away from said rolled-up membrane bag.

14. A method as set forth in claim 13, further comprising positioning a layer of porous material onto the outer side of the membrane bag prior to rolling it in about said one of said tubes.

* * * * *